Patented June 22, 1937

2,084,716

UNITED STATES PATENT OFFICE 2,084,716

PROCESS OF OBTAINING ZINC OXIDE

Werner von der Ohe, Beuthen, Germany, assignor to firm of Polensky und Zöllner, Berlin, Germany No Drawing. Application May 17, 1935, Serial No. 22,115. In Germany March 8, 1933

5 Claims. (Cl. 23—148)

My invention relates to processes of obtaining zinc oxide, and more particularly it relates to a process of obtaining zinc oxide from a mixture which, in addition to zinc oxide, contains an oxide of another volatile metal, or oxides of other volatile metals.

It is an object of my invention to provide an improved process of the kind referred to, by which zinc oxide, and particularly the pure zinc oxide known as zinc white, is efficiently obtained from such a mixture.

To this end, I heat the mixture in a slightly reducing atmosphere in the presence of a substance which combines with the oxide of the other volatile metal.

Any mixture of oxides of volatile metals may be treated by my novel process for obtaining zinc oxide therefrom. In the following specification, it will be assumed that the other volatile metal is lead.

The mixture which may be zinc oxide ore, or zinc oxide treated in a rotary furnace and containing a certain percentage of lead oxide, or any other mixture, with or without impurities, is heated in a slightly reducing atmosphere in a suitable furnace in the presence of a substance, for instance, sulphur ore ($FeS_2$), and at temperatures of the order of 900° C. The lead oxide is converted into lead sulphide by reaction with the sulphur ore, and the zinc oxide is collected separately. Separation may be effected in various ways, for instance, by flotation.

By analogous treatment of a mixture containing arsenic, the oxide of the other volatile metal is converted into arsenide.

Blende (ZnS) is particularly useful as an addition, since its content of zinc is converted into zinc oxide by the reaction.

The zinc oxide which has been obtained in the manner described, may be treated further for obtaining zinc white whose purity is about 99%. The zinc oxide is mixed with coke, and heated under reducing conditions. Pure zinc vapor forms and is oxidized into zinc oxide in separate compartments.

I have found that the further treatment of the zinc oxide is particularly effective if the crude zinc oxide ore, or other mixture, is agglomerated or sintered before being mixed with coke. An agglomerated or sintered mixture is one which is slag like and mostly porous. The agglomerated particles are very strong but yet permit ready and complete volatilization of the zinc, and practically no dust forms. If, in exceptional cases, a slight amount of dust is present, it has become so heavy that it is readily intercepted. The agglomeration has the additional advantage that small residues of lead are reduced, and that carbon particles which may still be present, are consumed by admission of secondary air, without an extra furnace, and will not contaminate the zinc oxide.

Agglomeration is preferably performed at temperatures of the order of 1350° C. which may be measured with an optical pyrometer.

The, preferably agglomerated, zinc oxide mixture may be heated under reducing conditions in various types of furnaces, for instance, rotary furnaces, reverberatory furnaces, furnaces with travelling grates, etc., but the most suitable type is the shaft furnace, as the formation of dust in such furnaces is a minimum and their yield is excellent if they are charged with agglomerated material at about equal volumes of coke and material.

Preferably, my process is performed as follows: The ore or other mixture of oxides of volatile metals, and the sulphonating agent, for instance, blende (ZnS), are treated in a furnace, preferably in a rotary cylinder, under reducing conditions at 850 to 950° C., until the lead oxide has been sulphonated, and the formed lead sulphide is volatilized. Care should be taken that the atmosphere in the furnace is almost neutral when the temperature has risen to about 1000° C. In the same operation, and, as far as possible, in a neutral or oxidizing atmosphere, the charge is agglomerated as described, at 1050° C., or even a higher temperature.

It has been found that, with this mode of operation, the zinc oxide obtained is free from sulphides and that no extra preparation is required for eliminating them, since apparently they are volatilized at the instant they form.

As described by way of example, the process is performed continuously. It may be simplified, however, by performing it intermittently, as will now be described.

Preferably, the intermittent process is performed in a rotary, normally cylindrical, reverberatory furnace of short length. In furnaces of this type, gas or other heating agents and air, are admitted at one end of the furnace, and the hot gases are discharged at its other end. The charge including the mixture of ore, coke, etc., is introduced from above through doors in the wall of the furnace, and the residue is discharged in downward direction through the same doors.

Suppose that the charge contains lead oxide and zinc oxide, and that sulphur ore ($FeS_2$) is added. The first stage is now performed in a slightly reducing atmosphere at about 900° C., the lead oxide is converted into lead sulphide, and the sulphide is volatilized. The hot gases are preferably conducted through a suitable filtering plant in which residues, such as the lead sulphide, are collected.

In the second stage, the zinc oxide is agglomerated at elevated temperature and with an oxidizing flame, and the hot gases are conducted through another filtering plant.

In the third stage, after the agglomeration has been completed, screened coke of the same grain size as the agglomerated material is introduced into the furnace, air is admitted, and the treatment is continued in a reducing atmosphere. The air which may be heated, consumes the coke. The hot gases are at first conducted through the second filtering plant but when pure vapors of zinc oxide form, which occurs after about 10 minutes, the hot gases are conducted through a third filtering plant in which pure zinc oxide or zinc white is separated.

Vapors of zinc developed during this reducing heating in the furnace are probably oxidized into zinc oxide partly by the admitted air and partly by the carbon dioxide ($CO_2$) which forms. Carbon monoxide which results from the reaction, has a tendency to dissociate into carbon dioxide and carbon at temperatures of about 900° C., as found by Boudouard in his investigations about the composition of mixtures of carbon monoxide and carbon dioxide under atmospheric pressure and at various temperatures. As the carbon resulting from the dissociation might interfere with the purity of the zinc white to be obtained, so much air is preferably admitted at the outlet of the furnace, that any carbon which may be present, is oxidized into carbon dioxide.

My invention will be more fully understood from the following examples:

I. Agglomerated zinc oxide ore containing 6.36% of lead in the shape of lead oxide, and 58.86% of zinc in the shape of zinc oxide, is reduced to a grain size of less than 1 mm., for instance, in a ball mill. A corresponding quantity of blende (ZnS) is added to the mixture, and the charge is heated to 850 to 950° C. in a slightly reducing atmosphere. Lead sulphide (PbS) forms according to the following equation:

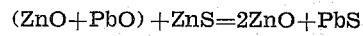

$$(ZnO + PbO) + ZnS = 2ZnO + PbS$$

The zinc oxide is separated from the lead sulphide by flotation, or in any other suitable manner, and may be purified, as described.

II. Agglomerated ore of the kind described in Example I and sulphur ore ($FeS_2$) which is added to the agglomerated ore in an amount corresponding to the percentage of lead oxide in the agglomerated ore, are heated to 850–950° C. in a slightly reducing atmosphere. The reaction is as follows:

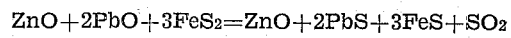

$$ZnO + 2PbO + 3FeS_2 = ZnO + 2PbS + 3FeS + SO_2$$

It appears that zinc oxide, lead sulphide, iron sulphide and sulphurous acid are formed. The acid escapes in gaseous condition.

Separation and purification, if any, may be performed as described heretofore.

III. Briquettes made of zinc oxides prepared in a rotary furnace, and containing 6 to 8% of lead, with addition of 30% of small coke, 3% of sulphuric acid, and sulphite lye, are smelted in a blast furnace at 1150 to 1250° C. The resulting pulverulent mixture of lead sulphide and zinc oxide, whose total content of metal oxides may be over 99%, is agglomerated and reduced to a grain size of less than 1 mm. in a ball mill. Blende is added, and the charge is treated as described in Example I.

IV. A rotary furnace which is 39 ft. long, whose inside diameter is 29 in., which is inclined 3 ft. per 100 and performs 48 revs. per hour and is preferably but not necessarily lined with neutral fire clay, is charged as follows: 770 kg. of oxide prepared in a rotary furnace and containing lead and zinc oxide, of floury condition (weight .8 kg. per litre), are mixed with 10 kg. of pulverulent blende prepared by flotation. The constituents of the charge are mixed thoroughly and the charge is introduced during one hour, through a gate which prevents the inflow of air with the charge. At the outlet end of the furnace which is also closed against undesired admission of air, the charge is heated with a reducing and almost neutral flame. The furnace may be heated with anthracite producer gas, or with powdered coal. The temperature in the furnace is 920 to 990° C. The material flows through the furnace from its inlet to its outlet in about 1¾ hour, and the flame is preferably regulated so that the percentage, per volume, of oxygen is less than .6, preferably .1 to .2, with a corresponding percentage of carbon dioxide (up to 16.4), and carbon monoxide. The material obtained is agglomerated zinc oxide free from lead.

It is understood that I am not limited to the substances with which my process may be performed as described. It has already been mentioned that the mixture may contain an arsenic compound instead of a lead compound, as described. It is also understood that I am not limited to the treatment of mixtures in accordance with my process, which contain only one constituent in addition to the zinc oxide.

I claim:

1. The process of obtaining zinc oxide from a mixture containing zinc oxide and lead oxide, comprising admixing with the mixture zinc sulfide, heating the resulting mixture in a slightly reducing atmosphere at about 900° C. until formation of lead sulfide takes place, and separating the lead sulfide thus formed from the zinc oxide residue.

2. The process of obtaining zinc oxide from a mixture containing zinc oxide and lead oxide, comprising admixing with the mixture zinc sulfide, heating the resulting mixture in a slightly reducing atmosphere at about 900° C. until formation of lead sulfide takes place, and separating the lead sulfide thus formed from the zinc oxide residue by a flotation process.

3. The process of obtaining zinc oxide from a mixture containing zinc oxide and lead oxide, comprising admixing with the mixture zinc sulfide, heating the resulting mixture in a slightly reducing atmosphere at about 900° C. until formation of lead sulfide takes place, and separating the lead sulfide thus formed from the zinc oxide residue by evaporating the lead sulfide in a slightly reducing atmosphere.

4. The process of obtaining zinc oxide from a mixture containing zinc oxide and lead oxide, comprising admixing with the mixture zinc sulfide, heating the resulting mixture in a slightly reducing atmosphere at about 900° C. until formation of lead sulfide takes place, and separating the lead sulfide thus formed from the zinc oxide residue by evaporating the lead sulfide in a slightly reducing atmosphere, sintering the zinc oxide residue by heating, reducing the sintered zinc oxide into zinc vapor, oxidizing the zinc vapor with air to zinc oxide, and filtering the hot gases for separating the zinc oxide, all the heating steps being performed in a single operation.

5. The process of obtaining zinc oxide from a mixture containing zinc oxide and lead oxide, comprising admixing with the mixture a substance selected from the group consisting of zinc sulfide and iron sulfide, heating the resulting mixture in a slightly reducing atmosphere at about 900° C. until formation of lead sulfide takes place, and separating the lead sulfide thus formed from the zinc oxide residue.

WERNER VON DER OHE.